US00RE34804E

United States Patent [19]

Lachman et al.

[11] E Patent Number: Re. 34,804

[45] Reissued Date of Patent: Dec. 6, 1994

[54] METHOD OF PRODUCING HIGH-STRENGTH HIGH SURFACE AREA CATALYST SUPPORTS

[75] Inventors: Irwin M. Lachman; Lawrence A. Nordlie, both of Corning, N.Y.

[73] Assignee: Corning Incorporated, Corning, N.Y.

[21] Appl. No.: 2,221

[22] Filed: Jan. 8, 1993

Related U.S. Patent Documents

Reissue of:

[64] Patent No.: 4,631,267
Issued: Dec. 23, 1986
Appl. No.: 712,874
Filed: Mar. 18, 1985

[51] Int. Cl.[5] ..... B01J 29/04; B01J 20/28; B01J 35/00

[52] U.S. Cl. ..... 502/64; 502/242; 502/263; 502/349; 502/439; 502/524; 502/527

[58] Field of Search ..... 502/527, 439, 64, 263, 502/351, 355, 524, 349, 242

[56] References Cited

U.S. PATENT DOCUMENTS

| | | | |
|---|---|---|---|
| 2,742,437 | 4/1956 | Houdry | 252/455 |
| 3,090,691 | 5/1963 | Weyer | 106/39 |
| 3,518,206 | 6/1970 | Sowards et al. | 252/446 |
| 3,554,929 | 1/1971 | Aarons | 252/462 |
| 3,637,525 | 1/1972 | O'Hara | 252/432 |
| 4,007,134 | 2/1977 | Liepa et al. | 252/455 Z |
| 4,121,909 | 10/1978 | Cronauer et al. | 23/288 R |
| 4,151,121 | 4/1979 | Gladrow | 252/455 Z |
| 4,158,621 | 6/1979 | Swift et al. | 208/114 |
| 4,277,376 | 7/1981 | Paolasini | 252/455 R |
| 4,294,806 | 10/1981 | Abe et al. | 423/210 |

FOREIGN PATENT DOCUMENTS

| | | |
|---|---|---|
| 19674 | 12/1980 | European Pat. Off. . |
| 0122572 | 10/1984 | European Pat. Off. . |
| 2554198 | 8/1976 | Germany . |
| 2658569 | 8/1982 | Germany . |
| 0138005 | 10/1979 | Japan . |
| 0017621 | 5/1980 | Japan . |
| 0045260 | 11/1980 | Japan . |
| 0095342 | 8/1981 | Japan . |
| 0035025 | 2/1984 | Japan . |
| 0035026 | 2/1984 | Japan . |
| 0035027 | 2/1984 | Japan . |
| 0035028 | 2/1984 | Japan . |
| 1064018 | 4/1967 | United Kingdom . |
| 1315553 | 5/1973 | United Kingdom . |
| 1474553 | 5/1977 | United Kingdom . |

OTHER PUBLICATIONS

Walter Heinrich Stoepler, *Investigations of the Correlation between Structure and properties of Aluminum Oxides and their Extrusion Behavior in the Fabrication of active, porous Aluminum Oxide Substrates,* Dissertation (1983).

*Primary Examiner*—Carl F. Dees
*Attorney, Agent, or Firm*—Angela N. Nwaneri

[57] ABSTRACT

A catalyst support having both substantial high strength and high surface area can be produced by heating a shaped mixture of a porous oxide having a surface area of at least 20 $m^2/g$ and the precursor of an inorganic binder for the porous oxide. The binders are precursors of alumina, silica, or [titania,] *zirconia* and are capable of imparting substantial strength to the support at relatively low firing temperatures.

30 Claims, No Drawings

METHOD OF PRODUCING HIGH-STRENGTH HIGH SURFACE AREA CATALYST SUPPORTS

Matter enclosed in heavy brackets [ ] appears in the original patent but forms no part of this reissue specification; matter printed in italics indicates the additions made by reissue.

BACKGROUND OF THE INVENTION

This invention relates to ceramic monolithic supports for catalysts and, in particular, to supports containing permanent inorganic binding materials which can be fired at low temperatures, imparting strength to the support while maintaining substantial surface area.

The conventional ceramic monolithic catalyst support consists of a ceramic support with a coating of a high surface material upon which the catalyst is actually deposited. In order to obtain substantial density and strength, the ceramic material normally must be fired at a high temperature. Such high-temperature firing, however, necessarily sinters the ceramic material and results in its having a very small surface area. Consequently, the ceramic must be coated with another material having a higher surface area, as well as specific chemical characteristics on which to actually deposit the catalyst. This procedure of depositing a high surface area 'washcoat' on the low surface area ceramic wall is disclosed, for example, in U.S. Pat. Nos. 2,742,437 and 3,824,196.

In addition to requiring the second production step of applying the washcoat, catalyst supports of this kind suffer from several disadvantages in use. In service, the supports are exposed to a flow of gases which often contain dusts or particulate matter, which can cause the high surface area coating to flake off the underlying ceramic support. This phenomenom can also occur where the support is exposed to thermal cycling because the wash coat and the underlying ceramic material often have different thermal expansion coefficients.

It is therefore an object of the present invention to provide a monolithic support having a high surface area which is not easily abraded. It is a further object of the invention to provide a monolithic support which develops substantial strength at temperatures below those at which the high surface area of the constituent materials would be adversely affected.

SUMMARY OF THE INVENTION

The present invention provides a method of producing a catalyst support having both high strength and high surface area. The method comprises (a) mixing into a substantially homogeneous body (1) a porous oxide having a surface area of at least 20 $m^2/g$ selected from the group consisting of zeolites, silica, alumina, spinel, [titania,] zirconia, and mixtures of these; (2) a precursor of a permanent binder for the porous oxide selected from the group consisting of alumina precursors, silica percursors, [titania precursors,] zirconia precursors, and mixtures of these; and (3) a temporary binder, and (b) heating the body to a temperature from 500–1000° C. to result in substantial strength and surface area. The permanent binders of this invention, incorporated into the support in their precursor-form, enable the support to develop substantial strength at firing temperatures lower than those normally required. The use of a lower firing temperature substantially eliminates the problem of temperature-induced loss of surface area by the porous oxide. The binder materials, in addition to imparting strength to the support, provide surface area of their own. As a result, a high strength support is provided which exhibits high surface area as well.

DETAILED DESCRIPTION OF THE INVENTION

According to the present invention, a method is provided to form a catalyst support structure in which a high surface area support phase of a porous oxide is bound into a strong cohesive mass by permanent binders which are uniformally mixed into the support structure itself. The porous oxide, precursors for the permanent binders, and a temporary binder are mixed into a substantially homogeneous body, which can be formed into any desired shape, and then heated according to conventional techniques of the ceramic arts. The method of the present invention, however, by virture of the permanent binders employed, permits the use of lower temperatures, generally below 1000° C., to form the support structure. Strength and density of the support structure, previously attained only at temperatures which led to reduction in surface area, are obtainable through the present method at relatively low temperatures, at which the surface area of the porous oxide phase is not seriously affected. It has been found, surprisingly, that better strength is gained by the use of the binders in precursor form than if an equal weight of the actual binder material (silica, alumina, *or* zirconia[, or titania]) had been incorporated into the support directly.

The porous oxides suitable for use as the support phase material herein are those which, after calcining, have a surface area of at least 20 square meters per gram, preferably at least 100 square meters per gram, and most preferably at least 200 square meters per gram. (As used herein "calcining" means heating a material to a temperature sufficiently high to substantially eliminate any volatiles but below that at which the material begins to lose substantial porosity.) Preferably, the oxide is alumina, silica, spinel, [titania,] zirconia or a zeolite. Mixtures of the oxides can also be used. The invention is not limited to these particular oxides, however, and as those skilled in the art will recognize, the invention contemplates the use of other materials which are commonly used as catalyst supports and which have the above-described characteristics.

The aluminas useful in the preparation of the high surface area support phase of this invention are those which, upon calcining, provide gamma-alumina or other transition aluminas having the specified surface area. Colloidal gamma-alumina can be used directly, or materials which generate a transition alumina upon calcining, such as alpha-alumina monohydrate, or alumina trihydrate can also be used. When alpha-alumina monohydrate or alumina trihydrate is used, the particle size can be from less than 1 micron up to about 100 microns. Suitable commercially available materials of this kind are Kaiser SA substrate alumina, available from the Kaiser-Chemical Division of Kaiser Aluminum Corporation, and the Catapal ® aluminas available from the chemical division of Conoco Corporation. The colloidal gamma-alumina is generally in the form of particles not exceeding 1 micron.

Spinels useful in the present invention are the magnesium aluminate spinels heretofore used as catalyst supports, including spinel solid solutions in which magnesium is partially replaced by such other metals as manganese, cobalt, zirconium, or zinc. Preferred spinels are magnesium aluminate spinels having 1-7 percent by weight alumina in excess of 1:1 $MgO.Al_2O_3$ spinel; that is, those having about 72.0-73.5 weight percent $Al_2O_3$ (balance MgO). Spinels of this kind are available on order from Baikowski International Corporation of Charlotte, North Carolina, or can be prepared by co-precipitation or wet-mixing precursor powders of alumina and magnesia, followed by drying and calcining. Such a procedure is described in U.S. Pat. No. 4,239,656, the disclosure of which is hereby incorporated by reference. As a supplement to this disclosure, however, it has been found that calcining of the spinels should normally not exceed 1300° C. for 2-2.5 hours. Calcining temperatures below 1200° C. are preferred. Suitable alumina precursor powders for preparation of the spinels are commercially available as Kaiser SA hydrated alumina. Magnesium oxide component powders found to be suitable are magnesium hydroxide slurry, about 40 weight percent MgO, available from Dow Chemical Company, or hydrated magnesium carbonate.

High surface area silicas that can be used in the practice of the present invention are the amorphous silicas of about 1-10 microns or sub-micron particle size such as Cabosil® EH-5 colloidal silica, available from Cabot Corporation. Colloidal silica derived from gels, such as Grade 952 from the Davison Chemical Division of W. R. Grace & Co. can also be used. [High surface area titanias suitable for use in the high surface area support phase are also commercially available, such as P25 $TiO_2$ available from DeGussa Corporation.]

The use of zeolites to provide high surface area in various catalytic and molecular sieving operations is well known. Readily-available zeolites useful in the present invention include the crystalline aluminosilicate zeolites with the art-recognized designations A, X, and Y, and silicalite which is virtually 100% silica. Zeolites A, X, and Y, and their methods of preparation, are disclosed in U.S. Pat. Nos. 2,882,243; 2,882,244; and 3,130,007, respectively. The disclosures of these patents are incorporated by reference. Silicalite is described in NATURE (Vol. 271), No. 5645 (1978).

Composites of alumina and silica also can form the basis for the high surface area porous oxide phase. Alumina-silica composites are commercially available from Davison Chemical Division of Grace Chemical Company and from the Norton Chemical Company, or can be prepared by the gel processes as described, for example, in U.S. Pat. Nos. 4,129,522 and 4,039,474. Alternatively, alumina and silica can be mixed directly in the preparation of the catalyst support as described below.

When the high surface area porous oxide material is an alumina, spinel, or a mixture of alumina and silica, it is preferred to add up to about 20 percent by weight (based on the alumina, spinel, or alumina-silica mixture weight) of a rare earth oxide. The preferred rare earth oxides are those of the "cerium subgroup", that is, elements of atomic number 57-62, particularly cerium and lanthanum. Cerium oxide is most preferred. Particularly useful spinels, for example, are those in which about 1 to 20 percent by weight, based on the total spinel weight, of cerium oxide is present. Cerium oxide is incorporated by adding, for example, cerium acetate, cerium carbonate, or cerium nitrate to the other precursor powders during the spinel preparation after calcining, or during formation of the catalyst support itself. In like manner, particularly useful mixtures of alumina and silica are those in which about 5 percent by weight, based on the total alumina and silica dry weight, of cerium oxide is present.

The preferred porous oxides for use in the high surface area support phase are the transition aluminas, particularly gamma-alumina, zeolites, silica, *and* zirconia[, and titania].

The permanent binders integrated into the catalyst support structures of this invention are silica, alumina, *or* zirconia[, or titania]. These binders are used in the presently described method in the form of "precursors" for the binders, meaning herein materials which, at or below the firing temperature of the green support structure, generate the actual binder component. The precursors are mixed with the high surface area porous oxide and with a temporary binder, to be described below, to form a plasticized mass which can be molded into the desired shape and then heated (fired).

It will be noted that the precursors to be described below are generally in the form of a dispersion, suspension, or solution in a liquid diluent. It is generally preferred that the precursors be in such form before being mixed with the porous oxide powders and temporary binder. However, binder precursors in solid form can be used directly, although they must be well mixed into either the water used in the batch plasticizing step (described below) or a diluent introduced into the batch as the carrier of some other component. In this dispersed, suspended, or dissolved form, the binder precursors are distinguished from the usual ceramic materials by size. When dispersed or suspended, the binder particles are broken down to virtually crystallite size below 200 angstroms and preferably below 100 angstroms. When the binder precursor is dissolved, the crystallites derived from the solute are of the same order of size. In contrast, ordinary ceramic materials are about three orders of magnitude coarser, usually greater than 20 microns in size. The binder particles substantially retaih this characteristic of small size in the final monolith support itself. Although some sintering of the binder can take place during the heating or firing of the monolith, it is expected that the crystallite size of the binder in the fired support will be no greater than about 2000 angstroms. Crystallite size can be determined by electron microscopy.

The porous oxides are generally of the same crystallite size as the binders, but are normally agglomerated into particles on the order of micron size, which, under ordinary conditions, do not adhere well to each other. The binders act as a "cement" for the agglomerated porous oxides in the final support structures and thereby provide substantial strength to the structure.

The preferred precursors for the permanent alumina binders are the hydrated aluminas, hydrolyzed aluminum isopropoxide, and aluminum chlorohydrate. The hydrated aluminas are most preferably in the form of aqueous suspensions. Aqueous suspensions are commercially available, such as from the Ethyl Corp., but are also easily prepared from commercially available alumina monohydrate and alumina trihydrate powders by dispersing these powders in water in the presence of an organic acid. Aluminum isopropoxide is commercially available as a dispersion in alcohol. For example, a dispersion of aluminum isopropoxide, 30-35 percent by weight in isobutanol, is available from the Alpha Products Division of Morton Thiokol Inc. The aluminum isopropoxide is hydrolyzed by refluxing the alcohol dispersion of the compound with water in the presence of an acid. Aluminum chlorohydrate is available in the form of an aqueous solution (for example, as CHLORHYDROL 50% or REHABOND CB-65S from Reheis Chemical Co. of Berkeley Heights, New Jersey) or as an organic derivative (such as REHYDROL II aluminum chlorohydrex from Reheis Chemical Co.). The latter is soluble in anhydrous alcohols, and is preferably used in this form. Aluminum chlorohydrate is also available in solid particulate form, as CHLORHYDROL Powder from Reheis Chemical Co., and can be pre-dissolved before mixing with the porous oxides or can be dissolved in the water used in the batch plasticizing step, to be described hereinafter.

Examples of preparations of precursors for alumina binders are as follows:

EXAMPLE A

Alumina Monohydrate Suspension

Ten parts by weight of alumina monohydrate powder is added to a solution of 89 parts of water and one part concentrated acetic acid. A suspension is obtained with moderate agitation.

EXAMPLE B

Hydrolyzed Aluminum Isopropoxide

To 516 ml of distilled water, at a temperature of 85°-90° C., is added 120 ml of a 30-35 weight percent dispersion of aluminum isopropoxide in isobutanol. This mixture is refluxed for one hour at a maximum temperature of 88° C., resulting in the formation of a thin gel-like slurry. 10 ml of 1.32 molar HCl is slowly added with stirring, and this mixture is refluxed for an additional 24 hours, resulting in a thin milky slurry. Ammonium hydroxide is added dropwise until a pH of 7-7.5 is reached. The result is a thick slurry which does not settle out on standing.

The preferred precursors for the permanent silica binders are silicone resins such as those disclosed in U.S. Pat. No. 3,090,681 issued to Weyer. The most preferred silicone resin is a hydroxyl functional silicone resin available from the Dow-Corning Co. as Resin 6-2230. The silicone resins, as the precursor, can be mixed directly with the porous oxide powders, in which case a solvent should be used during the plasticizing step to dissolve the resin. The resin can be predissolved in an appropriate organic solvent. Suitable solvents are alcohols such as methyl alcohol, ethyl alcohol, or isopropyl alcohol, which is preferred. Whether they are predissolved in a solvent or mixed directly with the porous oxide powders, the silicone resins are preferably milled first to a particle size finer than 20 microns, and more preferably finer than 10 microns.

The preferred precursor for the permanent zirconia binder is a suspension of an amorphous hydrated zirconium oxide, which can be in the form of hydrolyzed zirconium n-propoxide or a slurry of zirconium hydrate. Hydrolyzed zirconium n-propoxide is preferred and can be prepared by mixing the n-propoxide with an excess volume of water, preferably 400% excess, at room temperature for 10 days. After this time, the liquid is decanted and the solid washed with distilled water to yield a slurry of hydrated amorphous zirconium oxide.

[The preferred precursor for the permanent titania binders is a suspension of an amorphous hydrated titanium oxide. This can be in the form of hydrolyzed titanium isopropoxide or a slurry of titanium hydrate. Slurries of titanium hydrate are commercially available, such as from SCM Corp. It is preferred to neutralize such slurries, as may be necessary if they are acidic, so that they will be compatible with the temporary binders used in the invention. The preferred precursor of a permanent titania binder is a suspension of hydrolyzed titanium isopropoxide, an example of which is shown immediately below in Example C.

EXAMPLE C

Hydrolyzed Titanium Isopropoxide

To one gallon of water was added 298 ml of titanium isopropoxide. This mixture was stirred, and then allowed to sit for ten days at room temperature, after which time the resultant mixture was centrifuged, the liquid decanted, and the solid washed with distilled water. The resultant suspension was neutralized to a pH of 8.05. The titania content of the suspension is 0.1334 g of titania per gram of suspension.]

Although any of the permanent binders described herein are generally compatible with any of the porous oxides contemplated for use in this invention, certain combinations are nevertheless preferred. When the porous oxide is an alumina or a spinel, the preferred binders are suspensions of hydrolyzed aluminum isopropoxide, suspensions of hydrated alumina, and solutions of aluminum chlorohydrate. For silica as the porous oxide, the preferred binders are a silicone resin, aluminum chlorohydrate solutions, and suspensions of hydrated aluminas. [For titania, the preferred binders are based on slurries of hydrolyzed titanium isopropoxide, silicone resin, suspensions of hydrated alumina, and aluminum chlorohydrate solutions.] For zeolites, the preferred binders are based on silicone resins, suspensions of hydrated alumina, and aluminum chlorohydrate solutions. For zirconia as the porous oxide, the preferred binder is hydrolyzed zirconium n-propoxide.

In the practice of the present method, the porous oxide powders are mixed with the precursors for the permanent binder and with a temporary binder; that is, one which is completely or substantially completely burned off at the temperature at which the support structure is fired. The temporary binder has the primary function of forming a plasticized mass with the oxide powders and the permanent binder precursor, and can be any of the well-known materials commonly used in the ceramic art for such purposes. Suitable temporary binding agents are disclosed in:

"Ceramics Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129-132, 1946

"Organic (Temporary) Binders for Ceramic Systems," S. Levine, *Ceramic Age*, (75) No. 1, pp. 39+, January 1960

Temporary Organic Binders for Ceramic Systems" S. Levine, *Ceramic Age*, (75) No. 2, pp. 25+, February 1960

The most preferred binder is methyl cellulose, available as Methocel A4M from the Dow Chemical Co.

Generally, about 70-97 parts by weight of the porous oxide and 1-20 parts by weight of the temporary binder are mixed with sufficient permanent binder precursor to provide 3-30 parts by weight of the permanent binder material itself. For example, when the permanent binder precursor is a solution of aluminum chlorohydrate, the solution must be added in such amounts as will generate 3–30 parts by weight of alumina itself in the final support structure. This amount of alumina, of course, is independent of any alumina added as the high surface area porous oxide. Up to about 1 percent by weight, based upon total mixture weight, of a surfactant, such as sodium stearate, can also be used to facilitate mixing and flow for subsequent processing. The mixture is further plasticized by the addition of water and possibly a solvent, such as isopropyl alcohol, as well. When the permanent binder precursor is a silicone resin, it is preferred to use a 50/50 volume mixture of water and isopropyl alcohol to plasticize the batch. The silicone resin can be predissolved in the alcohol.

The mixture can also contain up to 20 percent by weight, based upon the total weight of the porous oxide powder and the permanent binder itself, of a clay such as kaolin. The clay provides additional binding action and imparts additional hardness and strength to the final support structure. The presence of clay is most useful in supports in which the porous oxide is alumina. A preferred kaolin clay is available from the Georgia-Kaolin Co. as HYDRITE MP kaolin.

The high surface area porous oxide powders can be substituted with substantial amounts of a compatible low surface area oxide powder to facilitate formation and drying so long as the average overall surface area of the oxide powders does not fall below 20 square meters per gram weight of oxide powder generally about 20 percent by weight of the porous oxide can be replaced by the low surface area powder, but in the particular case of silica, up to 80 percent of the high surface area silica can be replaced by low surface area silica. For example, 20 parts by weight of high surface area silica such as CABOSIL EH-5 silica (Cabot Corp.) can be combined with 80 parts by weight of low surface area silicas such as SUPERSIL silica (Pennsylvania Glass Sands Co.) in the preparation of catalyst supports according to the present invention. The total surface area per gram weight of the silicas is still in excess of 20 $m^2/g$ because of the high surface area of the CABOSIL silica (400 $m^2/g$).

The components are combined to form a homogeneous or substantially homogeneous mixture. Normally, the dry ingredients are first premixed, preferably in an intensive mixer, and then combined with the wet ingredients (i.e., binder precursors in suspensions or solutions, water, alcohols). It is critical that the high surface area porous oxide powder be well mixed into a plasticized mass with the permanent binder precursor. Conventional mixing equipment can be used, but the use of a mix muller is preferred. To effect further mixing, the batch can subsequently be extruded through a "noodling" die one or more times. Ultimately, the batch is formed into the desired support shape, preferably by extrusion through a die. The method of this invention is particularly well suited to the preparation of catalyst support structures in the shape of a honeycomb.

The "green" catalyst support shapes are heated (fired) at a temperature of about 500°–1000° C. for a period of about 4–6 hours. It is preferred to employ the lower temperatures within this range when the porous oxide is a zeolite. Optionally, the firing step can be preceeded by drying the support shapes at about 100°–120° C., preferably by steam heat. However, when a silicone resin is used as the precursor for the permanent binder, a drying temperature of 50° C. may be used initially to drive off solvent such as alcohol. This can be followed by steam-heat drying. The resulting monolithic support of this invention is comprised of 70–97 parts by weight of the porous oxide and 3–30 parts by weight of a permanent binder for the oxide dispersed throughout.

An advantage of the catalyst support structures of the present invention is the substantial strength obtained at relatively low firing temperatures; that is, temperatures of about 1000° C. or below. At these lower firing temperatures, sintering does not occur to an extent which adversely affects the surface area of the porous oxide phase of the support, or which causes excessive firing shrinkage. Substantial overall surface area of at least 20 $m^2/g$, preferably greater than 100 $m^2/g$, and most preferably greater than 150–200 $m^2/g$ is normally retained, and firing shrinkage is normally held to less than 5 percent, preferably less than 6 percent. Nevertheless, the use of the binder precursors of the invention contributes to the development of substantial strength in the support structure. The material preferably should obtain a flexural strength, measured as the modulus of rupture, of greater than 500 pounds per square inch (psi), more preferably greater than 1000 psi, and most preferably greater than 1500 psi. Accordingly, the support structures of the invention attain the combination of needed strength and high surface area without high temperature firing and the disadvantages that generally attend such procedures.

To determine the modulus of rupture, an extruded, fired rod of the material is supported at two points along its length and a load applied to the rod midway between the two supports. The load is gradually increased until the rod breaks. The modulus of rupture is calculated as $$M = \frac{16La}{3.14\,d^3}$$

where "M" is modulus of rupture; "L" is the load applied when the rod breaks (pounds); "a" is one-half the distance between the two supports (inches), and "d" is the rod diameter (inches).

The support structures of this invention may have some catalytic activity of their own by virtue of the chemistry and structure provided by the high surface area porous oxide and the permanent binder components. The support may further carry additional catalytically active ingredients dispersed throughout. These additional ingredients can be incorporated into the structure by methods well known in the art. The support structures of this invention, particularly those in the shape of honeycombs, are useful in most applications in which it is necessary to catalytically convert undesirable components in a gas stream prior to the stream's further processing or exhaustion to the atmosphere. Examples of such use are the catalytic converter in automotive exhaust systems and the conversion of fluids in the chemical or petroleum industries.

The following examples illustrate various embodiments of the invention. The examples are intended to be illustrative, but not limiting, of the invention.

EXAMPLES 1–5

In Examples 1–5, the ingredients listed in corresponding Tables 1A, 2A, 3A, *and* 4A [, and 5A] were combined according to their indicated weight parts, as follows. The dry ingredients were first intensively mixed to substantial homogeneity in a Littleford blender. The dry mixture was transferred to a mix muller into which were further added the "wet" components (the slurries of permanent binder precursors, water, alcohol). The resultant batch was mixed in the muller until a well-plasticized batch was attained. Each batch composition was extruded through a die to form rods having a diameter of 5/16-inch. The rods were heated at various temperatures between 500° C. and 1000° C. for a period of six hours. Measurements of overall surface area, firing shrinkage (linear), and modulus of rupture (according to the procedure described earlier herein) were taken. The results were recorded, for each example, in the corresponding "B" Table.

Examples 1–3 contain a control example (indicated) in which the catalyst support shape is comprised entirely of the high surface area porous alumina, no permanent binder precursor having been incorporated in precursor form into the green batch. These examples are presented for purposes of comparison. Among the examples, particularly preferred embodiments relating to alumina, *and* silica [, and titania] (as the high surface area oxides) are shown in Examples 1G, *and* 4C, [and 5D,] respectively.

TABLE 1A

| EX. NO. | Kaiser SA[1] Alumina | Alumina Monohydrate[8] Slurry | Alumina Monohydrate Slurry (Ex. A) | Aluminum[2] Chlorohydrate Macrospheres | Aluminum Isopropoxide (Ex. B.) | Aluminum[3] Chlorohydrate Solution | Alpha-Alumina[4] Monohydrate | Clay[5] | Methyl Cellulose | Water |
|---|---|---|---|---|---|---|---|---|---|---|
| 1A (control) | 100.0 | 0.0 | 0.0 | 0.0 | 0.0 | 0.0 | 0.0 | 0.0 | 6.0 | 90.8 |
| 1B | 90.0 | 109.1 | 0.0 | 0.0 | 0.0 | 0.0 | 0.0 | 0.0 | 6.0 | 0.0 |
| 1C | 92.0 | 119.0 | 0.0 | 8.0 | 0.0 | 0.0 | 0.0 | 0.0 | 6.0 | 0.0 |
| 1D | 84.0 | 0.0 | 0.0 | 8.0 | 8.0 | 0.0 | 0.0 | 0.0 | 6.0 | 85.0 |
| 1E | 82.0 | 100.0 | 0.0 | 8.0 | 0.0 | 0.0 | 0.0 | 10.0 | 6.0 | 2.0 |
| 1F | 66.0 | 0.0 | 0.0 | 0.0 | 0.0 | 14.0 | 10.0 | 10.0 | 6.0 | 53.8 |
| 1G | 76.0 | 0.0 | 0.0 | 0.0 | 7.25 | 8.2 | 9.5 | 0.0 | 6.0 | 66.3 |
| 1H | 76.0 | 0.0 | 0.0 | 0.0 | 14.5 | 0.0 | 9.5 | 0.0 | 6.0 | 60.5 |
| 1I | 76.0 | 0.0 | 0.0 | 0.0 | 0.0 | 14.5 | 9.5 | 0.0 | 6.0 | 69.1 |

TABLE 1B

| EX. NO. | Firing Temperature (°C.) | Modules of Rupture (psi) | BET Surface Area ($m^2/g$) | Linear Shrinkage (%) |
|---|---|---|---|---|
| 1A | 500 | 1740 | 219 | 1.45 |
| | 750 | 2200 | 147 | 2.1 |
| | 1000 | 2000 | 82 | 5.1 |
| 1B | 500 | 2030 | 235 | 1.47 |
| | 750 | 1950 | 186 | 2.04 |
| | 1000 | 2020 | 92 | 4.8 |

TABLE 1B-continued

| EX. NO. | Firing Temperature (°C.) | Modules of Rupture (psi) | BET Surface Area ($m^2/g$) | Linear Shrinkage (%) |
|---|---|---|---|---|
| 1C | 500 | 1230 | 268 | 2.2 |
| | 750 | 2900 | 179 | 2.4 |
| | 1000 | 2230 | 77 | 6.0 |
| 1D | 500 | 490 | 279 | 2.2 |
| | 750 | 550 | 198 | 2.5 |
| | 1000 | 600 | 87 | 5.6 |
| 1E | 500 | 2260 | 227 | 1.9 |
| | 750 | 1900 | 166 | 2.3 |
| | 1000 | 3020 | 84 | 5.3 |
| 1F | 500 | 2500 | 200 | — |
| | 750 | 2600 | 140 | — |
| | 10000 | 2800 | 70 | — |
| 1G | 500 | 2630 | 256 | 1.9 |
| | 750 | 2140 | 168 | 2.4 |
| | 1000 | 2410 | 91 | 4.8 |
| 1H | 500 | — | 220 | 1.7 |
| | 750 | — | 157 | 2.4 |
| | 1000 | — | 92 | — |
| 1I | 500 | 1530 | 250 | — |

TABLE 2A

| EX. NO. | Boehmite[6] | Alpha-Alumina Monohydrate[4] | Aluminum[3] Chlorohydrate Solution | Alumina-Monohydrate Slurry[8] | Methyl Cellulose | Clay[5] | Water |
|---|---|---|---|---|---|---|---|
| 2A (Control) | 100 | 0.0 | 0.0 | 0.0 | 6.0 | 0.0 | 41.0 |
| 2B | 76 | 9.5 | 13.1 | 0.0 | 6.0 | 0.0 | 34.1 |
| 2C | 90 | 0.0 | 0.0 | 44.5 | 6.0 | 0.0 | 0.0 |
| 2D | 66 | 10.0 | 14.0 | 0.0 | 6.0 | 10.0 | 28.8 |

TABLE 2B

| EX. NO. | Firing Temperature (°C.) | Modulus of Rupture (psi) | BET Surface Area ($m^2/g$) | Linear Shrinkage (%) |
|---|---|---|---|---|
| 2A | 500 | 370 | 201 | 0.29 |
| | 750 | 280 | 147 | 0.5 |
| | 1000 | 140 | 42 | 1.2 |
| 2B | 500 | 650 | 215 | 0.69 |
| | 750 | 600 | 130 | 0.86 |
| | 1000 | 400 | 48 | 1.80 |
| 2C | 500 | 1230 | 203 | 0.39 |
| | 750 | 1720 | 137 | 0.49 |
| | 1000 | 1090 | 40 | 1.11 |
| 2D | 500 | 530 | 165 | 0.48 |
| | 750 | 680 | 130 | 0.89 |
| | 1000 | 570 | 52 | 1.60 |

TABLE 3A

| EX. NO. | Alumina[7] Trihydrate | Alumina-[8] MonoTrihydrate Slurry | Aluminum[3] Chlorohydrate Solution | Alpha-Alumina[4] Monohydrate | Methyl Cellulose | Water |
|---|---|---|---|---|---|---|
| 3A (Control) | 100 | 0.0 | 0.0 | 0.0 | 6.0 | 55.4 |
| 3B | 90 | 64.4 | 0.0 | 0.0 | 6.0 | 0.0 |
| 3C | 76 | 0.0 | 9.7 | 9.5 | 6.0 | 32.4 |

TABLE 3A-continued

| EX. NO. | Alumina[7] Trihydrate | Alumina[8] MonoTrihydrate Slurry | Aluminum[3] Chlorohydrate Solution | Alpha-Alumina[4] Monohydrate | Methyl Cellulose | Water |
|---|---|---|---|---|---|---|
| 3D | 76 | 0.0 | 14.5 | 9.5 | 6.0 | 55.0 |
| 3E | 50 | 0.0 | 14.5 | 34.5 | 6.0 | 35.0 |

TABLE 3B

| EX. NO. | Firing Temperature (°C.) | Modulus of Rupture (psi) | BET Surface Area ($m^2/g$) | Linear Shrinkage (%) |
|---|---|---|---|---|
| 3A (Control) | 500 | 1540 | 204 | 1.2 |
| | 750 | 1500 | 124 | 1.4 |
| | 1000 | 1250 | 45 | 3.3 |
| 3B | 500 | 2080 | 275 | 0.98 |
| | 750 | 1810 | 167 | 1.25 |
| | 1000 | 1740 | 50 | 2.44 |
| 3C | 500 | 1130 | 189 | 0.82 |
| | 750 | 1050 | 149 | 1.30 |
| | 1000 | 800 | 49 | 2.50 |
| 3D | 500 | 1580 | 146 | 1.1 |
| | 750 | 1670 | 148 | 1.5 |
| | 1000 | 850 | 59 | 2.4 |
| 3E | 500 | 1260 | 246 | 1.3 |
| | 750 | 1190 | 154 | 1.8 |
| | 1000 | 1470 | 70 | 3.4 |

TABLE 4A

| EX. NO. | High Surface Silica[9] | Low Surface[10] Silica | Silicone[11] Resin | Methyl Cellulose | Isopropyl Alcohol (cc) | Water |
|---|---|---|---|---|---|---|
| 4A | 83 | 0 | 17 | 6 | 97.0 | 97.0 |
| 4B | 50 | 50 | 20 | 6 | 52.5 | 52.5 |
| 4C | 30 | 70 | 20 | 6 | 36.5 | 36.5 |
| 4D | 20 | 80 | 20 | 6 | 24.0 | 24.0 |

TABLE 4B

| EX. NO. | Firing Temperature (°C.) | Modulus of Rupture (psi) | BET Surface Area ($m^2/g$) |
|---|---|---|---|
| 4A | 500 | 330 | 272 |
| | 600 | — | 253 |
| | 700 | — | 202 |
| | 1000 | — | 45 |
| 4B | 500 | —* | 163 |
| | 600 | — | 141 |
| | 700 | — | 129 |
| | 1000 | — | 44 |
| 4C | 500 | 700 | 155 |
| | 600 | 575 | 121 |
| | 700 | 510 | 119 |
| 4D | 500 | 860 | 131 |
| | 600 | 620 | 121 |
| | 700 | 790 | 98 |
| | 1000 | 660 | 12 |

*Not suitable for strength tests.

[TABLE 5B

| EX. NO. | Firing Temperature (°C.) | Modules of Rupture (psi) | BET Surface Area ($m^2/g$) |
|---|---|---|---|
| 5A | 500 | 265 | 37 |
| | 640 | 940 | 21 |
| | 810 | — | 3.9 |
| | 1000 | 11,000 | — |
| 5B | 500 | 1,000 | 50 |
| | 640 | 1,200 | 80 |
| | 810 | — | 45 |
| | 1000 | 3,100 | 30 |
| 5C | 500 | 360 | 54 |
| | 640 | 900 | 33 |
| | 810 | — | 6 |
| | 1000 | 22,300 | 0.1 |
| 5D | 500 | 650 | 48 |
| | 640 | 2,200 | 27 |
| | 810 | — | 7 |
| | 1000 | 20,300 | 0.3 |
| 5E | 500 | 1,160 | 48 |
| | 640 | 900 | 45 |
| | 810 | — | 11 |
| | 1000 | — | 2 |
| 5F | 500 | 1,130 | 112 |
| | 640 | 1,090 | — |
| | 1000 | — | 22] |

[1]Kaiser S. A. substrate alumina, a hydrated alumina which, after heat treatment at 600° C. for one hour, has a weight loss-on-ignition of 27% and provides gamma-alumina, surface area 300 $m^2/g$.
[2]Reheis Chemical Company, CHLORHYDROL aluminum chlorohydrate.
[3]Fifty percent by weight is water, alumina content 24%, Reheis Chemical Company.
[4]CATAPAL 5B from Conoco Chemicals. After calcination at 900° F. for three hours provides surface area of 250 $m^2/g$.
[5]HYDRITE MP kaolin, Georgia-Kaolin Company.
[6]Alcoa Company F-1 alumina, particle size less than 100-mesh, surface area 2.2 $m^2/g$.
[7]Reynolds Company high surface area alumina trihydrate.
[8]Ethyl Corporation Alumina Monohydrate slurry.
[9]W. R. Grace Co. Grade 952 (Ex. 4A), CABOSIL EH-5 from Cabot Corporation surface area 400 $m^2/g$. median particle size 0.007 micron (Exs. 4B, 4C, 4D).
[10]SUPERSIL silica, particles finer than 200 mesh. Pa. Glass Sands Co.
[11]Dow Corning Company, Resin Q6-2230
[[12]SCM Corporation]

EXAMPLE 6

A preferred zeolite-based catalyst support was prepared from the following batch, figures indicating weight parts:

| | |
|---|---|
| Methyl Cellulose | 5 |
| Sodium Stearate | 0.5 |
| Silicone Resin (Dow Corning Q6-2230) | 22 |
| Zeolite (Union Carbide Corp. - 13X) | 78 |
| Distilled Water | 12.4 |

[TABLE 5A

| EX. NO. | $TiO_2$ | Methyl Cellulose | Silicone[11] Resin | Titanium[12] Hydrate Slurry | Hydrolyzed Titanium Isopropoxide (Ex. C.) | Aluminum[3] Chlorohydrate Solution | i-Propyl Alcohol (cc) | Water |
|---|---|---|---|---|---|---|---|---|
| 5A (Control) | 100 | 7.2 | 0.0 | 0.0 | 0.0 | 0.0 | 0.0 | 52.5 |
| 5B | 83 | 4.0 | 17.0 | 0.0 | 0.0 | 0.0 | 23.5 | 23.5 |
| 5C | 86.2 | 6.2 | 0.0 | 77.4 | 0.0 | 0.0 | 0.0 | 9.8 |
| 5D | 88.4 | 6.4 | 0.0 | 0.0 | 87.2 | 0.0 | 0.0 | 0.0 |
| 5E | 84.6 | 4.0 | 0.0 | 0.0 | 0.0 | 0.0 | 0.0 | 23.1 |
| 5F | 83.0 | 4.0 | 17.0 | 0.0 | 0.0 | 15.3 | 17.2 | 17.2] |

-continued

| | |
|---|---|
| Isopropyl Alcohol | 12.4 |

The materials were first dry mixed and then plasticized with the water and alcohol. The batch was extruded as a honeycomb and as rods for measurement of flexural strength. After heating at 500° C. for six hours, the material had a flexural strength, measured as the modulus of rupture, of 750 psi. X-ray diffraction analysis shows the same zeolite structure in the fired structure as in the raw batch.

EXAMPLE 7

A preferred zeolite-based catalyst support was prepared from the following batch, figures indicating weight parts:

| | |
|---|---|
| Methyl Cellulose | 6 |
| Silicone Resin (Dow Corning Q6-2230) | 17 |
| Silicalite (Union Carbide Corp. S-115 Silicalite zeolite) | 83 |
| Distilled Water | 11.3 |
| Isopropyl Alcohol | 33.9 |

The materials were first dry mixed and then plasticized with the water and alcohol. The batch was extruded as a honeycomb and as rods for the measuremet of flexural strength. After heating at 500° C. for six hours, the material had a flexural strength, measured as the modulus of rupture, of 1020 psi. X-ray diffraction analysis shows the same crystalline silicalite structure as in the S-115 raw material.

EXAMPLE 8

A preferred zeolite-based catalyst support was prepared from the following batch, figures indicating weight parts:

| | |
|---|---|
| Methyl Cellulose | 5 |
| Silicone Resin (Dow Corning Q6-2230) | 17 |
| Linde LZY-62 Y-Zeolite (Union Carbide Corp.) | 83 |
| Distilled Water | 21 |
| Isopropyl Alcohol | 21 |

The materials were first dry mixed and then plasticized with the water and alcohol. The batch was extruded as a honeycomb and as rods for the measurement of flexural strength. After heating at 500° C. for six hours, the material had a flexural strength, measured as the modulus of rupture, of 1230 psi. X-ray diffraction showed the same Y-zeolite structure as in the raw materials.

We claim:

1. A method of producing a monolithic catalyst support having substantial strength and high surface area comprising:

(a) Mixing into a substantially homogeneous body (i) a porous oxide having a surface area of at least 20 $m^2/g$ selected from the group consisting of zeolite, silica, alumina, *having a particle size of about 1–100 microns which when calcined provides gamma-alumina or other transition alumina,* spinel, [titania,] zirconia, and mixtures of these;

(ii) a precursor of a permanent binder for the porous oxide selected from the group consisting of alumina [precursors,] *hydrate, aluminum propoxide, aluminum chlorohydrate,* silica precursors, [titania precursors,] zirconia [precursors,] *hydrate, zirconium propoxide,* and mixtures of these, [said binder precursor having a crystallite size below 200 angstoms;] and (iii) a temporary binder; and (b) heating the body to a temperature of from 500°–1000° C. to result in substantial strength and substantial surface area and to substantially completely burn off said temporary binder.

2. The method of claim 1 in which the mixing step is performed using 70–97 parts by weight of the porous oxide, 3–30 parts by weight of the permanent binder precursor, and 1–20 parts by weight of a temporary binder.

[3. The method of claim 2 in which the permanent binder precursor is a suspension of amorphous hydrated titanium oxide in the form of a suspension of titanium hydrate or a suspension of hydrolyzed titanium isopropoxide.]

[4. The method of claim 2 in which the porous oxide is titania; the permanent binder precursor is a suspension of hydrolyzed titanium isopropoxide, aluminum chlorohydrate, or a silicone resin; and the temporary binder is methyl cellulose.]

5. The method of claim 2 in which the permanent binder precursor is a suspension of amorphous hydrated zirconium oxide in the form of a suspension of zirconium hydrate or a suspension of hydrolyzed zirconium n-propoxide.

6. The method of claim 2 in which the porous oxide is zirconia, the permanent binder precursor is a suspension of hydrolyzed zirconium n-propoxide, and the temporary binder is methyl cellulose.

7. The method of claim 2 in which the porous oxide has a surface are of at least 100 $m^2/g$ and is selected from the group consisting of alumina, silica, zeolite, and spinels.

8. The method of claim 7 in which the permanent binder precursor is a suspension of hydrated alumina, aluminum chlorhydrate, or a suspension of hydrolyzed aluminum isopropoxide.

9. The method of claim 8 in which the porous oxide is alumina; the permanent binder precurser is a suspension of hydrated alumina, a suspension of hydrolyzed aluminum isopropoxide, or aluminum chlorohydrate; and the temporary binder is methyl cellulose.

10. The method of claim 7 in which the porous oxide is a spinel, the permanent binder precursor is a suspension of hydrated alumina, a suspension of hydrolyzed aluminum isopropoxide, or aluminum chlorohydrdate; and the temporary binder is methyl cellulose.

11. The method of claim 7 in which the permanent binder precursor is a silicon resin.

12. The method of claim 7 in which the porous oxide is silica; the permanent binder precursor is a silicone resin, a suspension of a hydrated alumina, a suspension of hydrolyzed aluminum isopropoxide, or aluminum chlorohydrate; and the temporary binder is methyl cellulose.

13. The method of claim 12 in which the permanent binder precursor is a silicone resin.

14. The method of claim 7 in which the porous oxide is a zeolite; the permanent binder precursor is a silicone resin, a suspension of a hydrated alumina, aluminum chlorohydrate, or a suspension of hydrolyzed aluminum isopropoxide; and the temporary binder is methyl cellulose.

15. The method of claim [4,] 6, 9, 10, 12, or 14 which further comprises the step of forming the mixed body of step (a) into the shape of a honeycomb.

16. A catalyst support produced according to the method of claim 15.

17. A catalyst support of claim 16 having at least 20 square meters of surface area per gram of weight and a modulus of rupture of at least 500 pounds per square inch.

18. A catalyst support produced according to the method of claim 1 or 2.

19. A catalyst support of claim 18 which is in the shape of a honeycomb and which has at least 20 square meters of surface area per gram of weight and a modulus of rupture of at least 500 pounds per square inch.

20. A monolithic catalyst support having a modulus of rupture of at least 500 psi, comprising 70–97 parts by weight of a high surface area porous oxide phase and 3–30 parts by weight of a permanent binder for the porous oxide phase dispersed throughout wherein (i) the porous oxide phase has a surface area of at least 20 $m^2/g$ and consists of alumina, silica, zeolite, spinel, zirconia, or mixtures of these; and (ii) the binder results from heating in situ, at a temperature of 500°–1,000° C., a binder precursor consisting of alumina precursors, silica precursors, zirconia precursors, or mixtures of these, said binder precursor having a crystallite size below 200 anstroms.

21. A catalyst support of claim 20 in which the porous oxide is a spinel and the binder results from an alumina precursor.

22. A catalyst support of claim 20 in which the porous oxide is zirconia and the binder results from a zirconia precursor.

23. A catalyst support of claim 20 in which the porous oxide is alumina having a surface area of at least 100 $m^2/g$ and in which the binder results from an alumina precursor or a silica precursor.

24. A catalyst support of claim 20 in which the porous oxide is silica having a surface area of at least 100 $m^2/g$ and in which the binder results from a silica precursor or an alumina precursor.

25. A catalyst support of claim 20 in which the porous oxide is a zeolite having a surface area of at least 100 $m^2/g$ and in which the binder results from a silica precursor or an alumina precursor.

26. A catalyst support of claim 20, 21, 22, 23, 24 or 25 which has a surface area of at least 20 $m^2/g$ and in which the binder has a crystallite size of no greater than about 2,000 angstroms.

27. A monolithic catalyst support having a surface area of at least 20 $m^2/g$ and a modulus of rupture of at least 500 psi, comprising 70–97 parts by weight of a high surface area porous oxide phase and 3–30 parts by weight of a permanent binder for the porous oxide phase dispersed throughout wherein (i) the porous oxide phase consists of alumina, silica, zeolite, spinel, zirconia, or a mixture or these; and (ii) the binder is alumina, silica, zirconia, or a mixture of these, the binder having a crystalline size of no greater than about 2000 angstroms.

28. A catalyst support of claim 27 in which the porous oxide is a spinel and in which the binder is alumina.

29. A catalyst support of claim 27 in which the porous oxide is zirconia and the binder is zirconia.

30. A catalyst support of claim 27 in which the porous oxide is alumina, having a surface area of at least 100 $m^2/g$, and in which the binder is alumina, silica, or a mixture of these.

31. A catalyst support of claim 27 in which the porous oxide is silica, having a surface area of at least 100 $m^2/g$, and in which the binder is silica, alumina, or a mixture of these.

32. A catalyst support of claim 28 in which the porous oxide is a zeolite having a surface area of at least 100 $m^2/g$, and in which the binder is silica, alumina, or a mixture of these.

* * * * *